Oct. 24, 1961      J. N. DUPREE      3,005,907

ILLUMINATED PANEL ASSEMBLY

Filed July 26, 1960      3 Sheets-Sheet 1

INVENTOR:
James N. Dupree

By Smyth, Roston & Pavitt
Attorneys

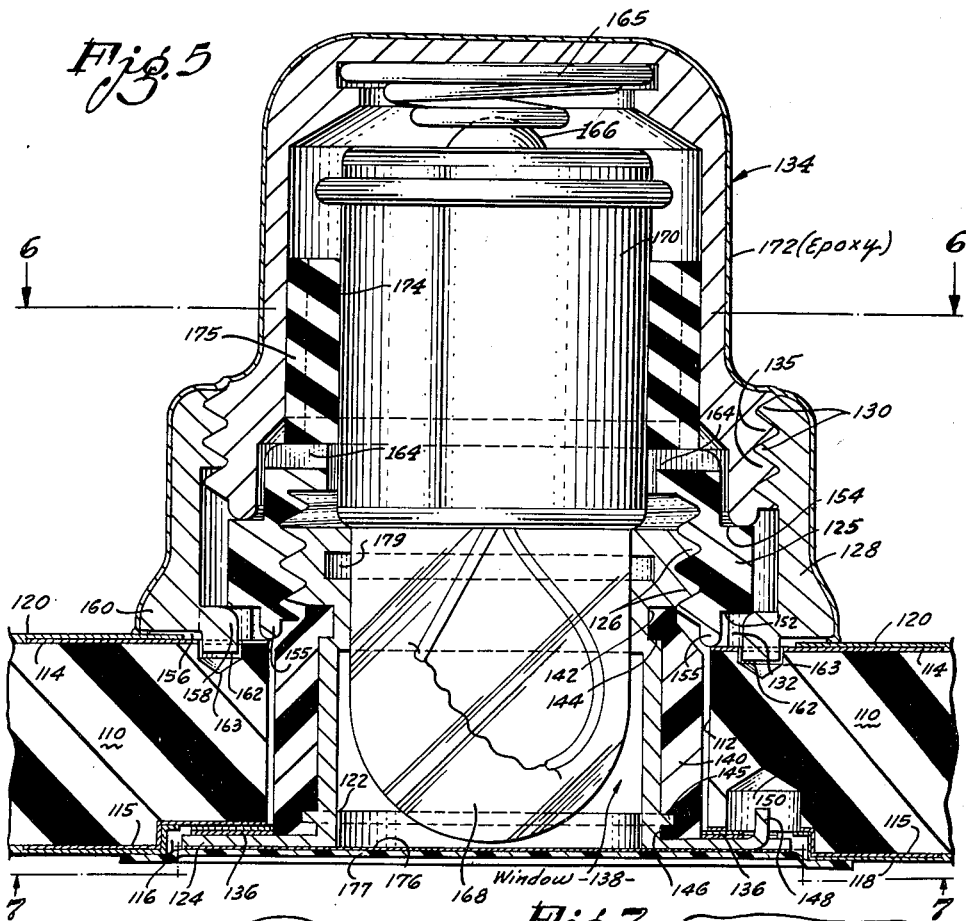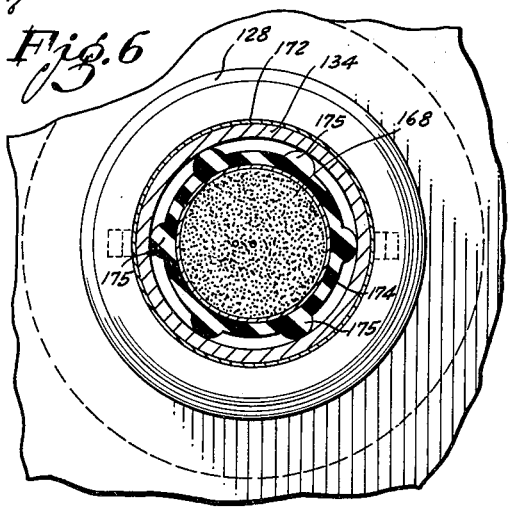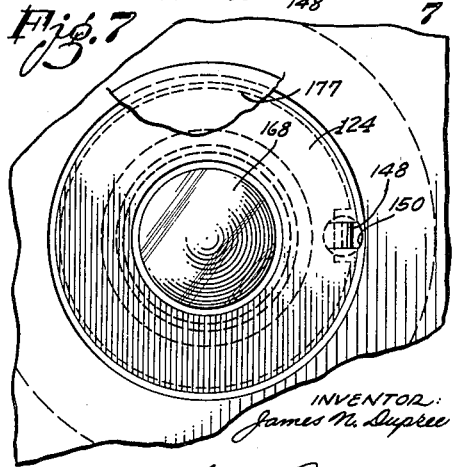

Oct. 24, 1961  J. N. DUPREE  3,005,907
ILLUMINATED PANEL ASSEMBLY

Filed July 26, 1960  3 Sheets-Sheet 3

INVENTOR:
James N. Dupree
By Smyth, Roston & Pavitt
Attorneys

United States Patent Office 3,005,907
Patented Oct. 24, 1961

3,005,907
ILLUMINATED PANEL ASSEMBLY
James N. Dupree, West Covina, Calif., assignor to California Plasteck, Inc., Los Angeles, Calif., a corporation of California
Filed July 26, 1960, Ser. No. 45,390
20 Claims. (Cl. 240—8.16)

The present invention relates to illuminated instrument panels for use on aircraft or the like. More particularly, the invention is concerned with an illuminated panel assembly which includes an edge-lighted or transilluminated panel of light transmitting transparent material, the indicia to be illuminated being cut-outs in an opaque coating on the front surface of the panel. The invention is specifically directed to an improved mounting unit in the form of a socket or housing for an electric lamp used in such an assembly.

This application is a continuation-in-part of my co-pending applications, Serial No. 622,314, filed November 15, 1956, now forfeited, entitled "Illuminated Panel Assembly," and Serial No. 767,134, filed October 14, 1958, now abandoned, entitled "Panel Lamp."

An important requirement for instrument panels in aircraft or the like is that their indicia be illuminated sharply and clearly in order that such indicia may be easily discernible and read. At the same time, it is essential that glare and other incidental illumination from the panels be avoided. These undesired illumination effects would tend to create distractions for the pilot or operator of the equipment and also would tend to adversely impair his vision.

The requirement referred to in the preceding paragraph is fulfilled in the present invention by the use of transilluminated panel assemblies. Such an assembly includes the provision of one or more electric lamp mounting sockets or housings, each of which mounts an electric lamp so that its illuminating portion extends directly into a corresponding recess in a light transmitting transparent panel covered by an opaque coating. The arrangement is such that all the direct rays from the lamps are shielded from the front of the panel.

One disadvantage in most prior art transilluminated instrument panels of the general type described above has been the difficulty experienced in providing a simple, inexpensive and foolproof socket or lamp housing and electric energizing circuit for the electric lamp used in the assembly. This disadvantage is overcome in the apparatus of the present invention by the provision of a socket or lamp housing for the lamp of unique and improved construction and of electric conductors extending to the socket or lamp housing formed directly on the opposite sides of the panel just under the opposite surfaces of the panel. These conductors may be deposited on the panel material in accordance with known printed circuit techniques. The conductors may be placed on the panel under the opaque coating referred to above. Therefore, the conductors may be completely hidden from view. Also, the panels may be mounted adjacent metallic walls, as in an aircraft, without the danger of short circuits.

The printed circuit conductors extend across the respective opposite surfaces of the panel to the various recesses in the panel in which the lamp housings for the illuminating lamps are mounted. In a manner to be described, electric contact is established in a simple and positive manner between the conductors and the improved lamp housing of the invention.

An important feature of the improved illuminated panel combination of the present invention is the provision of an improved lamp housing for the electric lamps used to transilluminate the panel. The lamp housing is constructed in a manner to be described to permit new lamps to be conveniently inserted from the front of the panel whenever replacements are needed. The construction is such that these insertions may be made without disturbing the other components of the mounting assembly in any way or affecting the rigid support of these components on the panel.

The socket assembly or lamp housing of the invention is also susceptible to the incorporation of a simple light filter for each illuminating lamp. These filters may be used when it is desired to reduce the intensity of the illuminated indicia inscribed on the front of the panel or to cause the indicia to appear colored. The assembly moreover is susceptible to a simple construction whereby substantially all the light from the illuminating lamps is directed into the interior of the panel. This construction provides for a relatively high illumination of the indicia on the panel. On the other hand, and where heating is a problem, the construction conveniently adapts itself to enable a portion of the light from each lamp to escape from the rear of the panel and to hold the internal heating of the panel to a minimum.

The present invention is further directed to certain problems that arise in the construction and installation of such a lamp housing.

One of these problems is to provide a base structure of simple, inexpensive construction that may be easily installed in the panel aperture and will not only grip the opposite faces of the panel in a permanent vibration-proof manner, but will also make electrical contact with the two sides of the printed circuit without any possibility of short circuiting. Another problem is to provide such a base structure that will effectively cut off paths for possible arcing across the circuit inside the lamp housing. Another problem is to adapt such a base structure for releasable engagement by the cap that is removable for lamp replacement. Still another problem is to provide means to releasably grip the lamp in the housing in a manner to withstand vibration.

Other problems relate to the window construction in the base structure. One of these problems arises from the fact that translucent plastic material is desirable for use in filtering the light to obtain a desired illumination hue, but plastic material is necessarily heated by the closely adjacent lamp and consequently tends to shrink and separate from the supporting structure. Another problem arises from the desirability of a specific orientation of the lamp housing windows for maximum illumination of selected zones of the panel.

The invention meets all of these problems by a lamp housing formed by four separate components. One component is a cylindrical metal member that fits into the panel aperture and provides the windows and the light filter. The inner end of this cylindrical member is flanged to engage the inner face of the panel and the outer end is threaded. The second component is a nut of non-conducting material that is threaded onto the outer end of the cylindrical component for clamping action. The third component is a metal bushing that is clamped by the nut against the outer face of the panel. Thus these three components form a permanent base structure that is rigidly clamped to the panel. The fourth component is a removable cap for screw-threaded engagement with the bushing.

The problem of anchoring the plastic filter material against shrinkage by heat is solved by embracing the cylindrical member with a plastic sleeve and undercutting the cylindrical member above and below the windows for anchorage of the plastic sleeve. The problem of ensuring correct orientation of the windows is met by providing the flanged cylindrical member with a key portion that engages an indexing recess in the panel at a predetermined position of rotation of the cylindrical member.

The various features and advantages of the invention may be understood from the following detailed description together with the accompanying drawings.

In the drawings, which are to be regarded as merely illustrative:

FIG. 5 is a sectional view on an enlarged scale of another embodiment of the lamp housing mounted in an edge-lighted panel;

FIG. 6 is a transverse section on a smaller scale taken along the line 6—6 of FIG. 5, and showing how a ribbed rubber-like sleeve embraces and stabilizes the lamp bulb in the housing;

FIG. 7 is a bottom view on a reduced scale of the installed lamp housing as seen along the line 7—7 of FIG. 5;

The illustrated assembly includes a transparent panel 10 of insulating material. This panel is shown in fragmentary form in FIG. 1, and it will be understood that the panel will have any desired shape or size, as dictated by the particular application in which it is to be used. The panel 10 may be composed, for example, of a transparent plastic material such as methyl methacrylate. This material is sold nationally by the Rohm & Hass Company under the trade name "Plexiglas."

The panel 10 is intended in most installations to be mounted in a vertical plane. With such a mounting, the bottom surface of the assembly of FIG. 1 constitutes the back of the panel, and the top surface of the assembly constitutes the front. The panel 10 is mounted on and supported by a metal backing plate 11 which is shown in phantom in FIG. 1. Suitable insulation over any electrically conductive elements on the back of the panel should, therefore, be provided for such an installation.

In a typical transilluminated panel assembly, many electric lamps are used for illuminating the transparent panel. Each of these lamps has its own individual mounting unit. One such unit is illustrated in FIG. 1.

Figure 1:
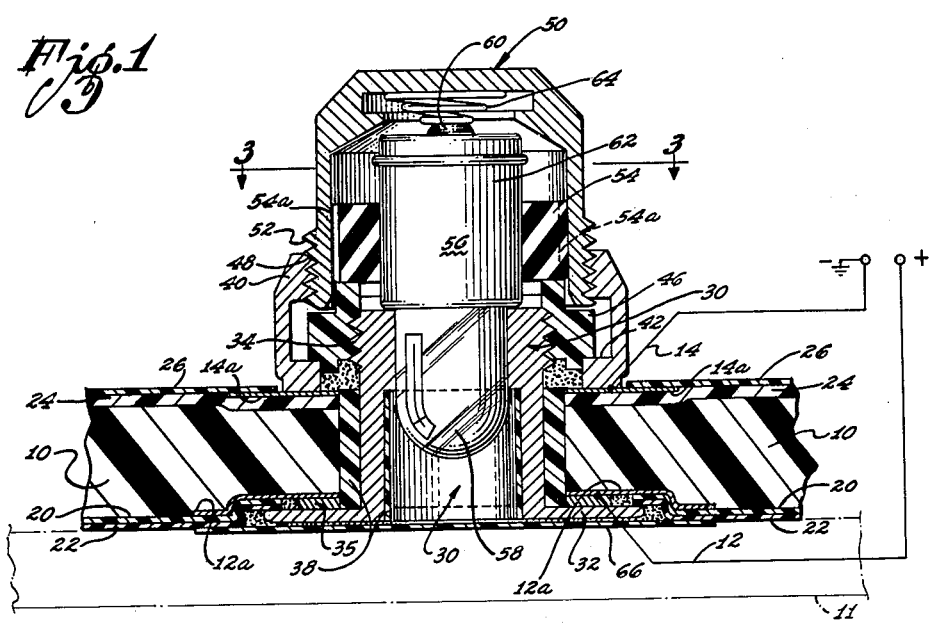
FIG. 1 is a sectional view on an enlarged scale showing a selected embodiment of a lamp mounting socket or housing mounted on a panel to transilluminate the panel.

To accommodate the lamp mounting unit of FIG. 1, an aperture is formed in the panel 10 extending through the panel. An electric conductor 12 which is shown in FIG. 1 is illustrated as an electric lead, but in actual practice it preferably would take the form of a printed electrical conductor formed in the front surface of the panel 10. This conductor connects a metallic eyelet 12a composed, for example, of copper and which is formed on the back surface of the panel around the aperture, to one terminal of an appropriate energizing electrical source. The eyelet 12a is formed on the panel 10 in accordance with known printed circuit techniques, and this eyelet preferably lies in an annular groove around the aperture formed in the back surface of the panel.

In like manner, an electrical conductor 14 on the front of the panel connects a metallic eyelet 14a (which may also be composed of copper) to the negative terminal of the power source. The conductor 14, like the conductor 12, may be formed on the surface of the panel 10 by printed circuit methods. The conductor 14 is preferably established at ground potential so that there will be no high voltage at the front of the panel 10. The eyelet 14a may, like the eyelet 12a, be formed on the surface of the panel 10 by printed circuit methods, and the eyelet 14a surrounds the aperture in the panel.

It should be pointed out that the conductors 12 and 14 which are conveniently formed on the opposite surfaces of the panel 10 by printed circuit techniques may be terminated in any appropriate form of terminal which, in turn, are connected to suitable leads extending to an appropriate power source. As noted above, the conductor 12 is normally disposed on the back of the panel 10 when the panel is placed in a usual installation. It is preferable for safety reasons that this rear conductor 12 be the "hot" lead. Therefore, a positive or negative electrical potential is usually introduced to the lead 12 by the power source, whereas the lead 14 is usually established at ground potential as mentioned previously. This assures that there will be no voltage on the conductors on the front surface of the panel 10.

As described above, the conductors 12 and 14 conveniently are printed on the opposite surfaces of the panel 10. In a constructed embodiment of the invention, these conductors were formed of silver and were deposited by a usual stencil screen process on selected areas of the top and bottom surfaces of the panel 10. Of course, these conductors could be formed on the surfaces of the panel by any well known printed circuit process. For example, the conductors could be deposited by metal evaporation, by etch foil, by photographic or other known processes.

An optically reflective, electrically insulating layer 20 of paint, or other suitable insulating and reflective material, is applied over the back surface of the panel 10. This layer serves to cover and insulate the electric conductor 12 when that conductor is printed on the surface of the panel 10. The layer 20 also assists in enhancing the internal surface reflection properties of the panel. The layer 20 may be composed, for example, of a white vinyl or of a suitable epoxy resin.

An opaque electrically insulating layer 22 is formed over the layer 20. The layer 22 may be composed of a suitable black enamel or it may be formed of an appropriate opaque epoxy resin. The latter layer 22 further electrically insulates the conductor 12 when such conductor is printed on the back surface of the panel 10, and it also prevents the escape of light through the rear surface of the panel.

It should be noted that the insulating layers 20 and 22 do not cover the major portion of the metallic eyelet 12a that surrounds the aperture in the panel. This enables electric contact to be made to the eyelet in a manner to be described.

The front surface of the panel 10 has a translucent layer 24 formed across the entire surface as a laminate with the panel. The layer 24 may be composed, for example, of a translucent white vinyl plastic. The conductor 14 may be deposited or otherwise formed on the surface of the panel over the laminate translucent layer 24. An opaque insulating coating or layer 26 composed, for example, of enamel or of an epoxy resin is formed over the translucent layer 24. The layer 26 also extends over the conductor 14 when that conductor is formed as a printed circuit on the panel 10.

Suitable indicia are inscribed on the front surface of the panel assembly by embossing the front surface into the shape of the desired indicia and by then scraping the opaque layer 26 from the resulting high relief areas to expose portions of the translucent layer 24.

The insulating opaque layer 26 does not fully cover the metallic eyelet 14a on the front surface of the panel so that electrical contact may be made to this eyelet in a manner to be described.

The housing for the lamp includes an electrically conductive metal cylindrical body member or bushing 30 which extends through the aperture in the panel. The bushing includes an outwardly extending radial flange 32. This flange abuts the rear surface of the panel 10 when the bushing is in place, and it establishes electrical contact between the bushing and the metallic eyelet 12a.

Figure 2:
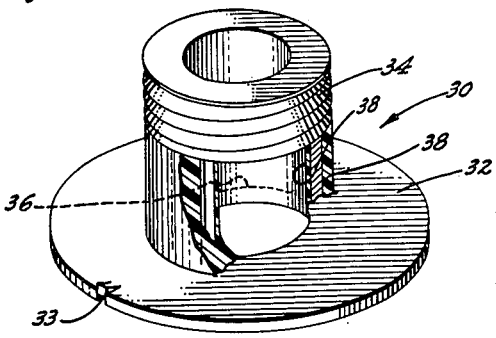
FIG. 2 is a perspective view of one of the components of the assembly shown in FIG. 1.

The bushing has an external threaded portion 34 which projects axially outwardly from the front surface of the panel 10 when the bushing is in place in the aperture. The bushing also includes a series of radial openings, such as the opening 36, FIG. 2. These openings are axially positioned on the bushing to lie between the opposite surfaces of the panel 10, and the openings are positioned at spaced angular positions around the periphery of the bushing. The axial portion of the bushing 30 in which the openings 36 are located is preferably encased in a tubular plastic light filter 38. This light filter covers the openings 36. The light filter may be colored so that the indicia inscribed on the front surface of the panel may appear with suitable coloration. Red has been found to be an appropriate color for the filter.

The mounting unit also includes an electrically conductive bushing member or sleeve 40. This sleeve is adapted to be positioned on the front surface of the panel 10 to extend around the aperture in the panel in coaxial relation with the bushing 30. The sleeve 40 has an inwardly extending annular flange portion 42. The flange portion 42 extends radially inwardly and is adapted to abut the front surface of the panel 10 and to establish electrical contact with the metallic eyelet 14a. The flange 42 may have a pair of suitable tangs (not shown) spaced 180° apart on its surface coating with the panel 10, and these tangs are adapted to extend into the surface of the panel and prevent rotation of the mounting unit.

A nut 46 composed of insulating material, such as nylon, threadedly engages the threaded portion 34 of the bushing 30. This nut coacts with the annular flange portion 42 of the sleeve 40, and it serves to clamp the sleeve against the front surface of the panel 10 in positive electrical contact with the eyelet 14a. At the same time, the nut draws the flange 32 of the bushing 30 securely against the back surface of the panel 10 into positive electrical contact with the eyelet 12a. The flange 32 may have a lance 33 formed in its peripheral edge, which lance engages the surface of the panel 10 to prevent rotation of the bushing 30 during the assembly operation. A bowed metallic conductive resilient washer 35 may be interposed between the flange 32 and the metal eyelet 12a. The washer 35 may be composed of beryllium copper. This washer serves to hold the assembly firmly against the opposite surfaces of the panel 10 even in the presence of wide temperature variations.

The insulating nut 46 serves to center the bushing 30 and the sleeve 40 into coaxial relation, and this nut also serves firmly to clamp the flange portions 32 and 42 against the respective eyelets 12a and 14a on the opposite sides of the panel 10. The nut 46 also has an axial portion which extends forward beyond the end of the bushing 30 for reasons to be described. The nut also has an axial portion which extends back between the conductive sleeve 40 and the conductive bushing 30, and the nut serves to insulate these conductive members from one another. An appropriate insulating cement may also be placed in the space between the back of the nut 46 and the surface of the insulating panel further to insulate the conductive members 30 and 40 from one another.

It will be appreciated that the bushing 30 is established in electrical contact with the conductor 12 through its flange 32 and through the eyelet 12a. The sleeve 40, on the other hand, is established in electrical contact with the conductor 14 through its flange 42 and through the eyelet 14a.

Figure 3:
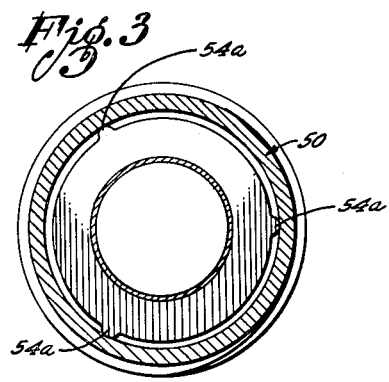
FIG. 3 is a cross-sectional view of the lamp socket or housing taken as indicated by the line 3—3 of FIG. 1.

The sleeve 40 has an internally threaded portion 48 at the front of the panel and an electrically conductive cylindrical cap 50 is threaded into the threaded portion 48 of the sleeve. The cap 50 has an externally threaded portion 52 which engages the internally threaded portion 48 of the sleeve. An integral end portion of the cap 50 extends across and encloses the end of the cap remote from the panel 10. An insulated apertured disk 54 may be positioned coaxially within the cap 50, and this disk centrally supports an electric lamp 56 in the illustrated position. The disk 54 is preferably in loose fit with the cap 50 and it serves merely to hold the lamp 56 in a centered position. The disk 54 has a series of axial ribs 54a (FIG. 3) which extends axially along its peripheral surface at spaced angular positions. These axial ribs engage the internal surface of the cap 50 and enable the disk 54 to be mounted in the cap without undue deformation of the disk.

The disk 54 is preferably a neoprene tube and the three ribs are spaced apart 120° on its outer surface. The lamp is in loose fit in the disk 54 so that it may be positively forced against the end of the bushing 30, as will be described.

The lamp 56 has an illuminating portion 58 which extends into the bushing 30 to be axially aligned with the radial openings, such as the opening 36, in the bushing. The lamp also has an electrical contact button 60 at one end and it has a usual cylindrical contact surface 62.

A conductive spring 64 is seated at the closed end of the cap 50 in electrical contact with the cap. This spring contacts the button 60 and biases the lamp forwardly in the disk 54 and against the bushing 30 with its contact surface 62 in positive electrical contact with the bushing 30.

Therefore, electrical contact is established to the button 60 of the lamp 56 through the conductor 14 and through the eyelet 14a, the sleeve 40, the cap 50 and the spring 64. Also, electrical contact is established from the lead 12 through the eyelet 12a and through the bushing 30 to the contact surface 62 of the lamp. Therefore, the lamp may be illuminated by the application of an energizing potential across the illustrated electrical terminals.

A thin insulating disk 66 composed, for example, of a vinyl or polyester plastic may be cemented over the flange portion 32 of the bushing 30 to completely cover the bottom of the mounting unit. This disk serves to insulate the bushing from extraneous conductors, such as the metal backing plate 11 on which the panel may be mounted, and it also serves to prevent the escape of light from the back of the panel.

A central aperture may be formed in the insulating disk 66 for installations where the escape of light is not too important, but where it is desired to hold the temperature of the socket aperture at a minimum.

It will be noted that no light escapes from the front of the transparent panel 10, but all the light from the lamp 56 is directed through the radial openings 36 of the flange 30 into the interior of the panel. By known edge-lighting principles, this light is translated through the interior of the panel. The escape of light from the surface of the panel is prevented by the internal reflecting properties of the panel surfaces and by the reflecting properties of the opaque insulating layers on the surfaces. This internal illumination of the panel causes the indicia inscribed on its front surface to appear in illuminated form.

The electric lamp 56 may be conveniently replaced in the event of burnout merely by unscrewing the cap 50 from the front of the panel and by placing a new lamp in the cap to be inserted with the cap into the socket assembly. The improved lamp housing or socket assembly of the invention is so constructed and devised that it remains rigidly in place on the panel even after the cap has been removed. This improved feature clearly facilitates the ease with which a lamp may be removed and replaced.

Figure 4:
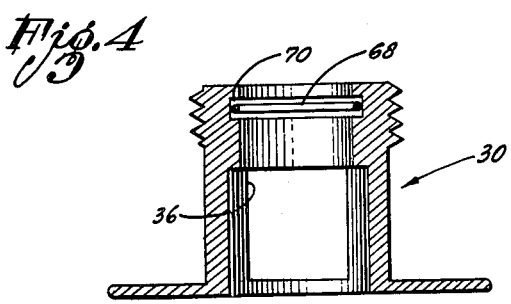
FIG. 4 is a sectional view of a modified component that may be substituted for the component shown in FIG. 1.

It will be noted that, and as previously pointed out, the insulating nut 46 has an axial portion that projects forward beyond the end of the bushing 30. This portion of the insulating nut has been found in some instances to be sufficient in itself to provide an adequate centering guide for the lamp 56. For such arrangements, the disk 54 may be omitted. As shown in FIG. 4, when the disk 54 is omitted, it may be desirable to provide a small spring wire 68 which is supported in an annular slot 70 on the internal surface of the end of the bushing 30. The spring wire 68 forms a resilient support for the lamp 56 and it surrounds the portion 58 of the lamp in friction engagement to hold the lamp in place. The spring wire 68 is particularly useful in applications where the panel 10 is mounted in a horizontal plane and the lamp extends upwardly into the aperture in the panel.

FIG. 5, illustrating a second embodiment of the invention, shows an edge-lighted panel comprising a plate 110 of substantial thickness made of substantially transparent plastic. The plate 110 has a circular aperture 112 therein to receive a lamp housing, and two sides of a printed lamp circuit are incorporated in the panel adjacent this aperture. In this instance, a deposit 114 of conducting material is bonded to the outer face of the plate 110 around the rim of the aperture 112 and a similar deposit 115 is bonded to the inner face of the plate 110 along the inner rim of the aperture, the latter deposit extending into a shallow annular recess 116 in the plate around the aperture. In addition, the inner face of the plate 110 has a coating 118 of insulating light-reflecting material and the outer face of the plate has at least one insulating coating including an outer coating 120 of opaque material, such as epoxy, having suitable cut-outs forming lettering, indicia, etc.

Four components make up the lamp housing proper. These four components are: a bushing or cylindrical metal member, generally designated by numeral 122, which fits into the panel aperture 112 and has a radial flange 124 at its inner end to engage the inner face of the panel, the flange being dimensioned to lie in the annular recess 116; a nut 125 of non-conducting material, for example nylon, which screws onto an external screw thread 126 that is formed on the outer end of the cylindrical member 122; a metal sleeve member or bushing 128 that is formed with an internal screw thread 130 at its upper end and is formed with an inner radial flange 132 at its inner end, this inner radial flange forming a shoulder for clamping of the bushing against the outer base of the panel by the nut 125; and a metal cover or cap 134 having an external screw thread 135 at its inner end to engage the screw thread 130 of the bushing 128.

The cylindrical member 122, together with the nut 125 and the metal bushing 128, constitutes the base structure of the lamp housing that permanently engages the two opposite faces of the panel. This base structure may be installed simply by first inserting the cylindrical member 122 into the aperture 112 from the inner side of the panel, then positioning the bushing 128 against the outer face of the panel and finally screwing the plastic nut 125 tight onto the outer end of the cylindrical member for clamping action to press the bushing snugly against the outer face of the panel. In the present practice of the invention, a washer 136 in the form of a marcel spring is inserted between the flange 124 of the cylindrical member 122 and the inner face of the panel. The stressing of this marcel spring 136 by the tightening of the plastic nut 125 pre-loads the clamping assembly to resist vibration and in addition provides compensation for the different rates of thermal expansion and contraction of the three components of the base structure and of the plate 110 of the panel.

Figure 10:
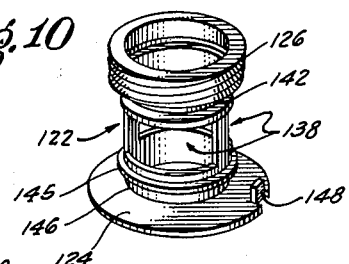
FIG. 10 is a perspective view of the cylindrical member of the assembly, which cylindrical member fits into the aperture of the panel and provides the window openings of the lamp housing.

As best shown in FIG. 10, the cylindrical metal member 122 is formed with a pair of diametrically opposite windows 138 and, as shown in FIG. 5, a plastic filter sleeve 140 embraces the cylindrical member to filter the light that passes outward through the windows 138. For anchorage of the upper end of the filter sleeve 140, the cylindrical metal member 122 has an upper outer circumferential groove 142 into which the plastic sleeve is molded, this groove forming an upwardly directed circumferential shoulder 144 for engagement by the plastic material. For anchorage of the lower inner end of the filter sleeve 140, the cylindrical metal member 122 has an outer circumferential groove 146 into which the plastic sleeve is molded, the lower end of the sleeve being anchored by the downwardly facing shoulder formed by the rib 145.

Whatever orientation is desired of the two windows 138 is predetermined by index means that may comprise an inwardly bent tongue 148 that is formed by lancing and bending a portion of the cylindrical member flange 124. A recess in the form of a shallow blind bore 150 is provided on the under face of the panel to receive the tongue 148 at the desired orientation.

The plastic nut 125 provides an annular shoulder 152 to clamp the bushing 128 against the outer face of the panel and further provides an opposite annular shoulder 154 against which the cap 134 may be tightened. Since the plastic nut has a desirable degree of inherent resiliency, it effectively resists vibration forces that would tend to loosen the nut and would tend to loosen the cap 134. The plastic nut 125 is further formed with an inner skirt or rim portion 155 that makes pressure contact against the outer face of the panel when the nut is tightened against the bushing 128. This pressure contact has a sealing effect and cuts off possible air paths for arcing between the cylindrical metal member 122 and the lower end of the bushing 128.

The metal bushing 128 is preferably recessed as indicated at 156 in FIG. 5 to form an inner circumferential portion 158 for pressure contact against the printed circuit material 114 and to form an outer circumferential portion 160 that slightly clears and overhangs the outer coating 120 of the panel in the region surrounding the exposed printed circuit material. In this embodiment of the invention, it is further contemplated that the inner circumferential portion 158 of the bushing 128 will be lanced for the formation of a pair of diametrically opposite tongues 162 and that the panel will be provided with recesses in the form of shallow bores 163 to receive the two tongues 162 for the purpose of preventing rotation of the bushing when the plastic nut 125 is tightened. Thus, when the plastic nut 125 is tightened in the course of installing the base structure of the lamp housing, both the cylindrical metal member 122 and the bushing 128 are anchored against rotation by positive engagement with the panel, only the plastic nut 125 being free to rotate. To facilitate such rotation, the plastic nut 125 is formed with aligned radial slots 164 across its outer rim to receive a screwdriver.

The cap 134 is adapted to seat a spiral spring 165 which serves not only to make electrical contact with an end contact 166 of a lamp bulb 168 to complete one side of the lamp circuit but also serves as spring means to hold the ferrule 170 of the lamp bulb in contact with the upper end of the cylindrical metal member 122 to complete the second side of the lamp circuit and to hold the lamp bulb in place in a manner that resists vibration. Since the cap 134 and the bushing 128 are part of one side of the lamp circuit, it is desirable that the exposed surfaces of the cap and bushing be covered with an outer layer 172 of insulating material. The cap and bushing may be sprayed with a suitable epoxy or a suitable elastomer for this purpose.

In the embodiment of the invention shown in FIG. 5, the lamp bulb 168 is stabilized in the lamp housing and held against lateral vibration by means of a rubber-like sleeve 174 that releasably embraces the lamp ferrule 170 inside the cap 134. In this instance, the rubber-like sleeve 174 is formed with at least three external longitudinal ribs 175 which contact the inner circumferential surface of the cap 134. The rubber-like sleeve 174 is dimensioned for a forced fit in the cover 134 so that the ribs 175 are slightly compressed radially between the lamp bulb ferrule 170 and the surrounding inner circumferential wall of the cap 134.

When the lamp housing is firmly mounted in the panel with the nylon nut 125 tightened, a thin bright aluminum disk 176 is placed across the open inner end of the lamp housing and is held in place by a pressure-sensitive plastic disk 177 of larger diameter which readily adheres to the inner face of the panel. The aluminum disk both reflects and dissipates heat, and additionally reflects light. The plastic disk insulates the inner end of the lamp housing.

The manner in which the embodiment of the invention shown in FIG. 5 serves its purpose may be readily understood from the foregoing description. It is a simple matter to install the base assembly of the lamp housing comprising the cylindrical metal member 122, the plastic nut 125 and the bushing 128. Correct orientation of the windows 138 of the cylindrical metal member 122 for maximum illumination of desired zones is assured by the seating of the index tongue 148 in the panel aperture 150. It is a simple matter to insert a lamp bulb 168 into the rubber sleeve 174 inside the cap 134 and then to screw the cap into the bushing 128 tightly against the shoulder 154 of the plastic nut 125, thereby placing the lamp bulb 168 in the correct position in the panel aperture 112 with the lamp bulb sealed off from the region in front of the panel. With the lamp bulb 168 installed in the completely assembled lamp housing, the only possible air path for arcing between the cylindrical metal member 122 on one side of the lamp circuit and the cooperating cap 134 and bushing 128 on the other side of the lamp circuit is over the top rim of the plastic nut 125 through the screwdriver slots 164. This path, however, is long enough to give adequate protection against a short circuit.

Figure 8:
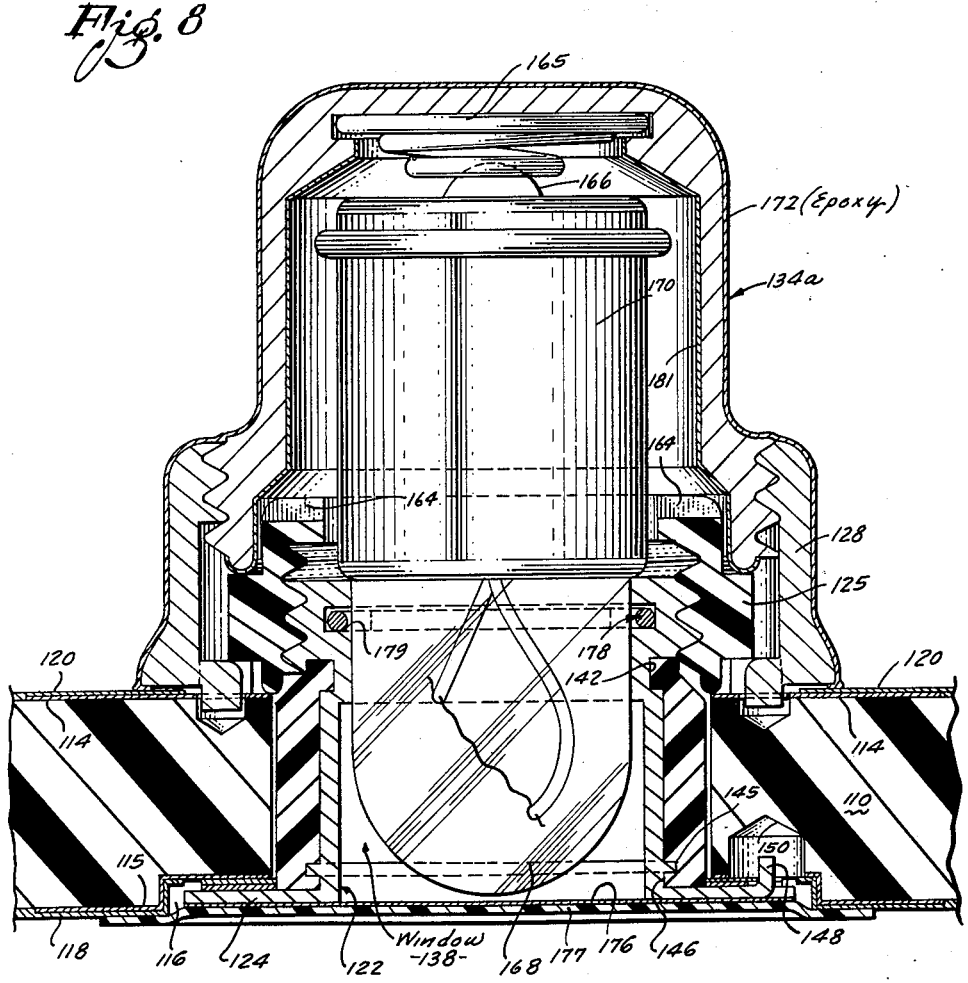
FIG. 8 is a view similar to FIG. 5 illustrating the fact that the ribbed rubber-like sleeve may be omitted and its function performed by a wire clip in the base structure of the housing.
Figure 9:
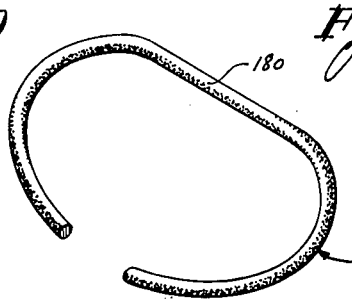
FIG. 9 is a perspective view of the wire clip.

The third embodiment of the invention illustrated by FIGS. 8 and 9 is identical with the embodiment shown in FIG. 5 as indicated by the use of corresponding numerals to indicate corresponding parts. The only difference is that the ribbed rubber sleeve 174 is omitted and a spring wire clip 178 shown in FIG. 9 is mounted in an inner circumferential groove 179 of the cylindrical metal member 122 to stabilize the lamp bulb 168. The spring wire clip 178 has a straight portion 180 which presses against the side of the lamp bulb for this purpose. Preferably the inner circumferential surfaces of the cap 134a are provided with an insulating liner which may be in the form of an inner epoxy coating 181. With the cap 134a unscrewed from the bushing 128 in FIG. 8, a lamp bulb 168 is installed simply by inserting the lamp bulb into the cylindrical metal member 122 for frictional pressure engagement by the spring clip 178. The cap 134a is then screwed into the bushing 128 to bring the spiral spring 165 against the end contact 166 of the lamp bulb.

My description in specific detail of the presently preferred practices of the invention will suggest various changes, substitutions and other departures from my disclosure within the spirit and scope of the appended claims.

I claim:
1. In an illuminated panel assembly for utilizing an electric lamp, the combination of: an insulating panel of light transmitting material having an aperture therein; a pair of electrical conductors carried by said panel adjacent the edge of the aperture; an electrically conductive bushing member extending through said aperture in said panel and having an outwardly extending radial flange for abutment with one of the opposite surfaces of said panel and for electrical contact with one of said conductors, said bushing member having a threaded portion projecting outwardly from the other of the opposite surfaces of said panel and further having at least one radial opening therein axially positioned to lie within the aperture in the panel between said opposite surfaces thereof; an electrically conductive sleeve member adapted to be positioned on the other surface of said panel coaxial with said bushing member for abutment with said other surface of said panel and for electrical connection with the other of said conductors, said sleeve member having an inwardly extending shoulder; and a nut member of insulating material threadably engaging said threaded portion of said bushing member and engaging said inwardly extending shoulder of said sleeve member to clamp said sleeve member and the flange of said bushing member firmly against said opposite surfaces of said panel.

2. In an illuminated panel assembly for utilizing an electric lamp having an illuminating portion and further having a pair of electrical contacts, the combination of: an insulating panel of light transmitting material having an aperture therein; a pair of annular electrical conductors carried by said panel adjacent the edge of the aperture; an electrical conductive bushing member extending through said aperture in said panel and having an outwardly extending radial flange for abutment with one of the surfaces of said panel and for electrical connection with one of said conductors, said bushing member having an externally threaded end portion projecting outwardly from the other of the opposite surfaces of said panel and further having at least one radial opening therein axially positioned to lie within the aperture in the panel between said opposite surfaces thereof; an internally threaded electrically conductive sleeve member adapted to be positioned on said other surface of said panel in coaxial relation with said bushing member and surrounding said end portion thereof for abutment with said other surface of said panel and for electrical connection with said other of said conductors, said sleeve member having an inwardly extending shoulder; an insulated nut member threadably engaging said threaded end portion of said bushing member and abutting against said inwardly extending shoulder of said sleeve member to clamp said sleeve member and the outwardly extending flange of said bushing member firmly against said opposite surfaces of said panel; and mounting means threadably engaging said internally threaded sleeve member for mounting an electric lamp in said bushing member with its illuminating portion disposed within the aperture in the panel and facing said one surface of said panel, with one of the electrical contacts of the lamp in electrical contact with said bushing member and with the other of the electrical contacts of the lamp in electrical communication with said sleeve member.

3. In the panel assembly defined in claim 2, said mounting means being an electrically conductive cylindrical member threadably engaging said internally threaded sleeve member and establishing electrical contact between said sleeve member and one of the electrical contacts of the lamp, and said mounting means forcing the other electrical contact of the lamp into abutment with said bushing member to establish electrical contact between said bushing member and the other electrical contact of the lamp.

4. A mounting unit for mounting an electric lamp in an illuminated panel assembly, which assembly includes an insulated panel having an aperture therein, and which further includes a pair of electrical conductors carried by the panel adjacent the edge of the aperture, said mounting unit including: an electrically conductive bushing member dimensioned to extend through the aperture in the panel and having an outwardly extending radial flange for abutment with one of the opposite surfaces of the panel and for electrical connection with one of the conductors, said bushing member having a threaded portion positioned and dimensioned to project axially outwardly from the other of the opposite surfaces of the panel and further having at least one radial opening therein axially positioned to lie within the aperture in the panel between the opposite surfaces thereof; an electrically conductive sleeve member to be positioned on the other surface of the panel coaxially with said bushing member for abutment with the other surface of the panel and for electrical connection with the other of the conductors, said sleeve member having an inwardly extending shoulder; and a nut member of insulating material in threaded engagement with said threaded portion of said bushing member to engage said inwardly extending shoulder of said sleeve member so as to clamp said sleeve member and the flange of said bushing member firmly against the opposite surfaces of the panel.

5. A combination as set forth in claim 1 in which said nut member engages the inner circumferential surface of said radial flange to maintain the nut member in said sleeve member in concentric relation thereto.

6. A mounting unit as set forth in claim 4 which includes a tubular light filter of plastic material mounted coaxially with said bushing member and bonded thereto to cover said radial opening therein.

7. A mounting unit as set forth in claim 4 which includes a cap member in removable threaded engagement with said sleeve member.

8. A mounting unit as set forth in claim 7 which includes a rubber-like spacer sleeve inside said cap member to embrace said electric lamp.

9. A mounting unit as set forth in claim 8 in which said spacer sleeve has outer longitudinal ribs to fit into said cap member.

10. A mounting unit as set forth in claim 4 in which said sleeve member has an internal screw thread; and which includes a removable cap member, said removable cap member having an external screw thread to engage said internal screw thread.

11. A mounting unit as set forth in claim 7 which includes annular means inside said cap member lining the cap member and insulating the cap member from said lamp.

12. A lamp housing for mounting a lamp in an aperture in a panel of light-transmitting material, said lamp having a ferule contact and an end contact, said lamp housing comprising: a metal cylindrical body member to extend into the aperture in the panel, said cylindrical member having an external screw thread at its outer end and having a flange at its inner end to engage the inner surface of the panel adjacent said aperture, said cylindrical member seating said ferrule contact to connect the lamp to one side of a lamp circuit; a metal bushing surrounding said cylindrical member and radially spaced therefrom to engage the outer surface of said panel adjacent said aperture, said bushing having a screw thread at its outer end and having a radially inward flange at its inner end; a nut member of non-conducting material engaging said exterior screw threads of the cylindrical member and engaging said flange of said bushing for tightening on said cylindrical member against said flange of the bushing to clamp said panel between said flange of the bushing and said flange of the cylindrical member to anchor the cylindrical member in said aperture, said nut being slotted diametrically at its outer end for rotation by a screw driver; and a metal cap having a screw thread engaging said screw thread of the bushing for removably mounting the cap on the bushing, said cap being in electrical communication with said end contact of the lamp whereby the cap and bushing may connect the lamp to the second side of the lamp circuit.

13. A lamp housing for mounting a lamp in an aperture in a panel of light-transmitting material, said lamp having a ferrule contact and an end contact, said lamp housing comprising: a metal cylindrical body member to extend into the aperture in the panel, said cylindrical member having an external screw thread at its outer end and having a flange at its inner end to engage the inner surface of the panel adjacent said aperture, said cylindrical member seating said ferrule contact to connect the lamp to one side of a lamp circuit; a metal bushing surrounding said cylindrical member and radially spaced therefrom engaging the outer surface of said panel adjacent said aperture, said bushing having a screw thread at its outer end and having a radially inward flange at its inner end; a nut member of non-conducting material engaging said exterior screw thread of the cylindrical member and engaging said flange of said bushing for tightening on said cylindrical member against said flange of the bushing to clamp said panel between said flange of the bushing and said flange of the cylindrical member to anchor the cylindrical member in said aperture, said nut having a rim portion at its inner end to make sealing contact with the outer surface of the panel inside said flange of the bushing when the nut member is tightened against said flange of the bushing; and a metal cap having a screw thread engaging said screw thread of the bushing for removably mounting the cap on the bushing, said cap being in electrical communication with said end contact of the lamp whereby the cap and bushing may connect the lamp to the second side of the lamp circuit.

14. A lamp housing for mounting a lamp in an aperture in a panel of light-transmitting material, said lamp having a ferrule contact and an end contact, said lamp housing comprising: a metal cylindrical body member to extend into the aperture in the panel, said cylindrical member having an external screw thread at its outer end and having a flange at its inner end to engage the inner surface of the panel adjacent said aperture, said cylindrical member seating said ferrule contact to connect the lamp to one side of a lamp circuit; a metal bushing surrounding said cylindrical member and radially spaced therefrom engaging the outer surface of said panel adjacent said aperture, said bushing having a screw thread at its outer end and having a radially inward flange at its inner end; a nut member of non-conducting material engaging said exterior screw thread of the cylindrical member and engaging said flange of said bushing for tightening on said cylindrical member against said flange of the bushing to clamp said panel between said flange of the bushing and said flange of the cylindrical member to anchor the cylindrical member in said aperture; and a marcel spring washer surrounding said cylindrical member between said flange of the cylindrical member and the inner surface of said panel to compensate for thermal expansion and contraction of the materials of the cylindrical member, said nut member, and said flange of the bushing.

15. A lamp housing for mounting a lamp in an aperture in a panel of light-transmitting material, said lamp having a ferrule contact and an end contact, said lamp housing comprising: a metal cylindrical body member to extend into the aperture in the panel, said cylindrical member having an external screw thread at its outer end and having a flange at its inner end to engage the inner surface of the panel adjacent said aperture, said cylindrical member seating said ferrule contact to connect the lamp to one side of a lamp circuit, said cylindrical member having an inner circumferential groove; spring means seated in said groove to press against said lamp to stabilize the lamp; a metal bushing surrounding said cylindrical member and radially spaced therefrom engaging the outer surface of said panel adjacent said aperture, said bushing having a screw thread at its outer end and having a radially inward flange at its inner end; a nut member of non-conducting material engaging said exterior screw thread of the cylindrical member and engaging said flange of said bushing for tightening on said cylindrical member against said flange of the bushing to clamp said panel between said flange of the bushing and said flange of the cylindrical member to anchor the cylindrical member in said aperture; and a metal cap having a screw thread engaging said screw thread of the bushing for removably mounting the cap on the bushing, said cap being in electrical communication with said end contact of the lamp whereby the cap and bushing may connect the lamp to the second side of the lamp circuit.

16. A lamp housing for mounting a lamp in an aperture in a panel of light-transmitting material, said lamp having a ferrule contact and an end contact, said lamp housing comprising: a metal cylindrical body member to extend into the aperture in the panel, said cylindrical member having an external screw thread at its outer end and having a flange at its inner end to engage the inner surface of the panel adjacent said aperture, said cylindrical member seating said ferrule contact to connect the lamp to one side of a lamp circuit, said flange of the cylindrical member having a portion projecting for engagement with a recess on the inner side of said panel to hold the cylindrical member against rotation relative to the panel when said nut member is tightened; a metal bushing surrounding said cylindrical member and radially spaced therefrom to engage the outer surface of said panel adjacent said aperture, said bushing having a screw thread at its outer end and having a radially inward flange at its inner end; a nut member of non-conducting material engaging said exterior screw thread of the cylindrical member and engaging said flange of said bushing for tightening on said cylindrical member against said flange of the bushing to clamp said panel between said flange of the bushing and said flange of the cylindrical member to anchor the cylindrical member in said aperture; and a metal cap having a screw thread engaging said screw thread of the bushing for removably mounting the cap on the bushing, said cap being in electrical communication with said end contact of the lamp whereby the cap and bushing may connect the lamp to the second side of the lamp circuit.

17. A lamp housing as set forth in claim 16 in which said cylindrical member has windows therein and in which said portion of the flange of the cylindrical member engages said recess at a predetermined location on the inner side of said panel for predetermined orientation of said windows.

18. A lamp housing as set forth in claim 16 in which said bushing has a portion for engagement with a recess on the outer side of said panel to hold the bushing against rotation relative to the panel when said nut member is tightened.

19. A lamp housing installed in an aperture in a panel of light-transmitting material and mounting therein a lamp having a ferrule contact and an end contact, said lamp housing comprising: a metal cylindrical member open at both of its ends to extend into the aperture in the panel, said cylindrical member having an external screw thread at its outer end and having a flange at its inner end to engage the inner surface of the panel adjacent said aperture, said cylindrical member seating said ferrule contact to connect the lamp to one side of a lamp circuit; a metal bushing surrounding said cylindrical member and radially spaced therefrom engaging the outer surface of said panel adjacent said aperture, said bushing having a screw thread at its outer end and having a radially inward flange at its inner end; a nut member of non-conducting material engaging said exterior screw thread of the cylindrical member and engaging said flange of said bushing to clamp said panel between said flange of the bushing and said flange of the cylindrical member to anchor the cylindrical member in said aperture; a metal cap having a screw thread engaging said screw thread of the bushing for removably mounting the cap on the bushing, said cap being in electrical communication with said end contact of the lamp whereby the cap and bushing may connect the lamp to the second side of the lamp circuit; a metal disc spanning the inner open end of said cylindrical member to dissipate heat from the lamp; and a larger disc of insulating material covering said metal disc and bonded at its margins to the inner face of said panel.

20. A lamp housing as set forth in claim 19 in which said metal disc is a thin bright reflective disc.

References Cited in the file of this patent

UNITED STATES PATENTS

| | | |
|---|---|---|
| 2,824,954 | Roper | Feb. 25, 1958 |
| 2,846,970 | Dupree | Aug. 12, 1958 |
| 2,847,654 | Peak et al. | Aug. 12, 1958 |
| 2,860,234 | Stevens | Nov. 11, 1958 |